US009825994B1

(12) United States Patent
Azcondo et al.

(10) Patent No.: US 9,825,994 B1
(45) Date of Patent: Nov. 21, 2017

(54) DETECTION AND REMOVAL OF UNWANTED APPLICATIONS

(71) Applicant: Malwarebytes Inc., Santa Clara, CA (US)

(72) Inventors: Carlos Ardanza Azcondo, Bilbao (ES); Elisabeth Irizar Nieto, Bergara (ES); Luis Maria Zubia Murguiondo, Balmaseda (ES); Francisco Sanchez Peña, Santurtzi (ES); Pedro Bustamante Lopez-Chicheri, Mountain View, CA (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 15/491,879

(22) Filed: Apr. 19, 2017

(51) Int. Cl.
*H04L 29/06* (2006.01)

(52) U.S. Cl.
CPC .................................. *H04L 63/20* (2013.01)

(58) Field of Classification Search
CPC ....................................................... H04L 63/20
See application file for complete search history.

(56) References Cited

U.S. PATENT DOCUMENTS

| 8,312,536 | B2 | 11/2012 | Nachenberg et al. |
| 8,499,063 | B1 | 7/2013 | Satish et al. |
| 8,677,346 | B1 | 3/2014 | Griffin et al. |
| 9,081,958 | B2 | 7/2015 | Ramzan et al. |

*Primary Examiner* — Oleg Korsak
(74) *Attorney, Agent, or Firm* — Fenwick & West LLP

(57) ABSTRACT

A protection application detects and removes unwanted applications. The protection application scans a client device for suspected unwanted applications. A security server provides an application rating for detected applications to the client device. The application rating is generated based on application retention data received from client devices indicating whether users of the clients choose to remove or retain the application when given the option. The application retention data may be weighed based on a categorization of the clients providing the application retention data into to clients expected to have different reliability levels. The security server can also provide a definition specifying all known components associated with a suspected unwanted application. Responsive to a selection to remove a suspected unwanted application, the protection application uninstalls all components of the application.

20 Claims, 5 Drawing Sheets

DETECTION AND REMOVAL OF UNWANTED APPLICATIONS

FIELD OF ART

The present disclosure generally relates detecting and removing unwanted applications and more specifically to reputation-based detection and removal of unwanted applications.

BACKGROUND

Unwanted applications (also known as "bundleware," "bloatware," or "crapware") often come bundled with a desired user application that the user wants to retain and use. Thus, when a user installs the desired application, the bundled unwanted applications are also installed, often unknowingly. The unwanted applications may consume computational resources of client devices without providing desired benefit to users. Some unwanted applications may even compromise the security of client devices. An unwanted application can look and function similar to other user applications. Thus, unwanted applications are traditionally difficult to detect, remove, and prevent from installing.

SUMMARY

A method generates information for removing unwanted applications. Application retention data received from a plurality of client devices indicate detections of an application on the plurality of client devices and selections to remove respective instances of the application. An application rating for the application is generated based on the application retention data. An indication of a detection of a suspected unwanted application file associated with the application is received from a target client device. Responsive to the indication of the detection, a definition for the application associated with the suspected unwanted application file is determined. The application rating and the definition for the application are provided to the target client device. The target client device is adapted to use the definition to selectively remove the application from the target client device.

In some embodiments, the plurality of client devices is categorized into two or more categories representing different reliability levels. The application retention data from different ones of the plurality of client devices is weighted based on their respective categories to generate sub-scores for each of the two or more categories. The application rating is generated by combining the sub-scores.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A protection application detects potentially unwanted applications, provides ratings for the detected applications indicating their reputation for being unwanted, and removes unwanted applications. The ratings are based in part on application retention data tracking how many users choose to remove the application and how many choose to retain the application when given the option. If the application is deemed unwanted, the protection application obtains a definition for the unwanted application that identifies components associated with the unwanted application and enables the protection application to find and remove all of its components.

Figure 1:
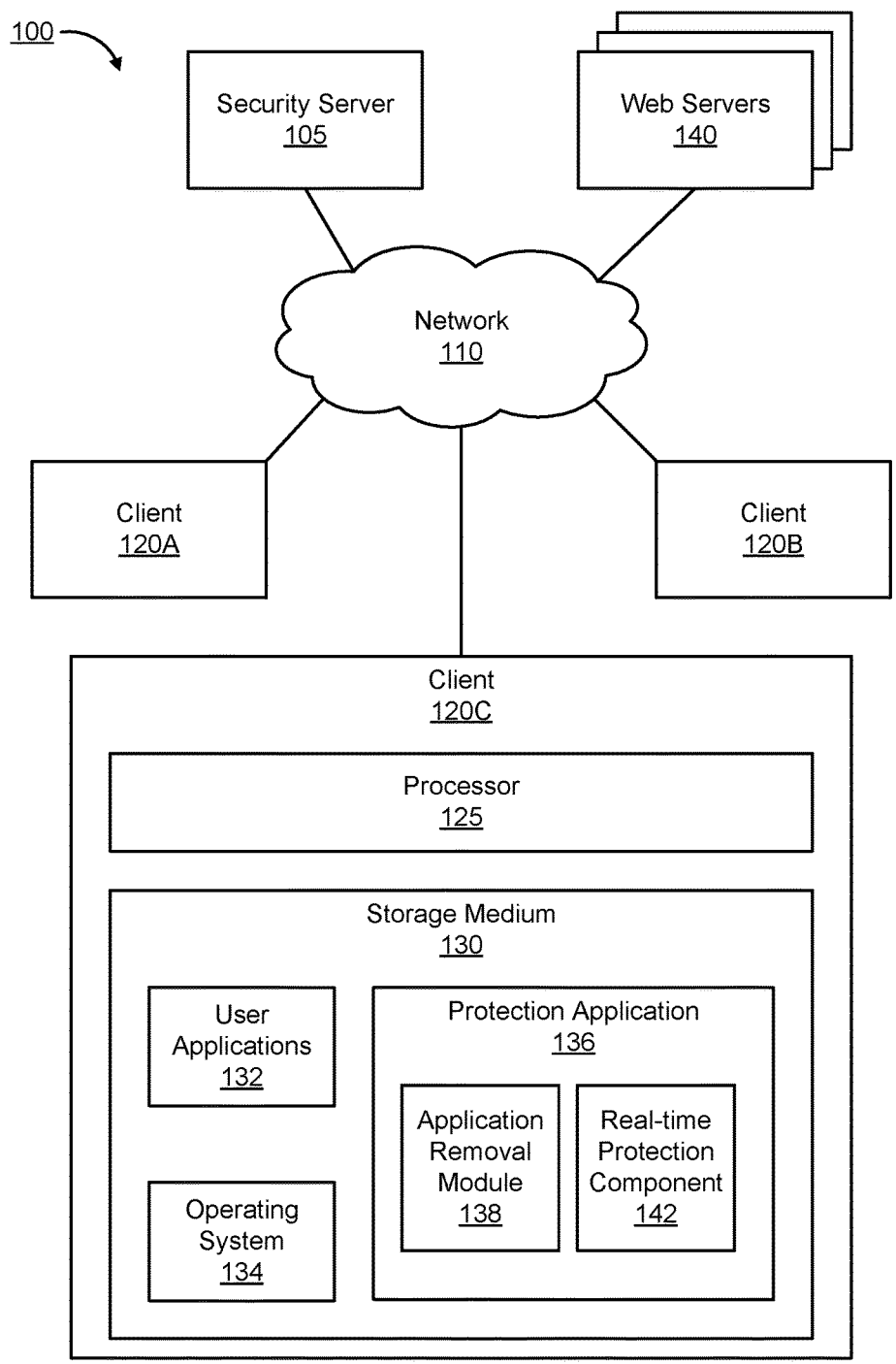
FIG. 1 is a system diagram illustrating an example embodiment of an environment in which a protection application executes.

FIG. 1 is a high-level block diagram illustrating a system environment 100 for a protection application. The system environment 100 comprises a security server 105, a network 110, various clients 120A, 120B, 120C (collectively referenced herein as clients 120 or client devices 120), and various web servers 140. For simplicity and clarity, only one security server 105 and a limited number of clients 120 and web servers 140 are shown; however, other embodiments may include different numbers of security servers 105, clients 120, and web servers 140. Furthermore, the system environment 100 may include different or additional entities.

The security server 105 and the web servers 140 (collectively referenced herein as servers) are computer systems configured to store, receive, and transmit data to clients 120 or to other servers via the network 110. A server may include a singular computing system, such as a single computer, or a network of computing systems, such as a data center or a distributed computing system. The server may receive requests for data from clients 120 and respond by transmitting the requested data to the clients 120.

The security server 105 stores information about known applications and provides definitions to the clients 120 that include relevant information for removing unwanted applications. The security server 105 furthermore generates ratings for applications that indicate a reputation for being unwanted based on application retention data received from clients 120 tracking how many users choose to remove the application and how many choose to retain the application when given the option. The security server 105 is described in further detail below with reference to FIG. 2.

The web servers 140 may comprise, for example, a website server that provides web content for viewing on clients 120 or a file server that provides files that can be downloaded by the clients 120. The web servers 140 are potential sources of user applications and may be sources of unwanted applications that may become installed on one or more clients 120. For example, as a user downloads a user application from a website or file server, an unwanted application bundled with the user application may become installed on a client 120, often without the user's knowledge.

The network 110 represents the communication pathways between the security server 105, clients 120, and web servers 140. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data as well as transmitting and receiving data via a network 110. For example, a client 120 (also referred to herein as a client device 120) may be a desktop computer, a laptop computer, a mobile phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, and external memory storage devices. In addition to storing program instructions, the storage medium 130 stores various data associated with operation of the operating system 134, protection application 136, and other user applications 132.

In one embodiment, the storage medium 130 comprises a non-transitory computer-readable storage medium. Various executable programs (e.g., operating system 134, protection application 136, and user applications 132) are each embodied as computer-executable instructions stored to the non-transitory computer-readable storage medium. The instructions, when executed by the processor 125, cause the client 120 to perform the functions attributed to the programs described herein.

The operating system 134 is a specialized program that manages computer hardware resources of the client 120 and provides common services to the user applications 132. For example, a computer's operating system 134 may manage the processor 125, storage medium 130, or other components not illustrated such as, for example, a graphics adapter, an audio adapter, network connections, disc drives, and USB slots. A mobile phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 can be a source of an unwanted application that is unknowingly bundled or hidden in the user application 132. The unwanted application may be installed on the client 120 when the user application 132 is installed. The distinction between a desired user application 132 and an unwanted application may be subjective.

A protection application 136 detects and removes unwanted applications ("unwanted apps") installed or otherwise stored on the client 120. The protection application 136 may also prevent new unwanted applications from being installed on the client 120. In order to assess whether or not an application is an unwanted application, the protection application 136 may access the security server 105 via the network 110 to download ratings derived from application retention data associated with the application. Furthermore, the protection application 136 may obtain definition files from the security server 105 for unwanted applications that specify components of known unwanted applications. The protection application 136 uses the definition files to detect and remove unwanted applications. The protection application 136 may have an identifier associated with a version such as a consumer-level, business-level, or professional-level version. A protection application 136 may have different available functionality based on the corresponding version. For example, a professional-level version protection application 136 provides more functionality to a user than does a consumer-level version protection application 136. The protection application 136 may provide the identifier indicating the associated version to the security server 105.

The protection application 136 includes an application removal module 138 configured to detect and remove unwanted applications that are already installed on the client 120. For example, the application removal module 138 may scan the storage medium 130 or portions thereof to detect whether the client 120 has any files matching a predefined list of files associated with suspected unwanted applications. In addition to scanning to detect files, the application removal module 138 may also detect registry entries, scheduled tasks, services, shortcuts, icons, plugins, binary files, directory addresses, Internet or browser cookies, metadata, extensions, homepages, search engines, or other types of components associated with suspected unwanted applications. Upon detection, the application removal module 138 provides the scanned data to the security server 105, which processes the scanned data to determine a list of components associated with the suspected unwanted applications. The application removal module 138 obtains the list of components and ratings for the suspected unwanted applications from the security server 105, and may present (e.g., via a user interface) the ratings, which represent the retention-based reputation of each application. Particularly, the rating may be based in part on a proportion of users that decide to remove the application when given the option. Additionally, the protection application 136 may provide data to the security server 105 such as a unique identifier of the matching file from the predefined list, an identifier of the client 120, the identifier indicating the version of the protection application 136, or other information.

The application removal module 138 may present the user with an option to remove the suspected unwanted applications based on the ratings obtained from the security server 105. If the user chooses to remove the application, the application removal module 138 may remove all components of the application specified in the definition. The application removal module 138 may also provide application retention data to the security server 105 indicating whether the user decided to remove or retain a detected application when presented with the option and the rating. A user may perform a scan for unwanted applications on a client 120 by running the application removal module 138. Additionally, the protection application 136 may run the application removal module 138 in the background during regular use of the client 120 without requiring manual input from the user.

The protection application 136 also includes a real-time protection component 142 that is configured to prevent the installation of new unwanted applications. As one example, the real-time protection component 142 may detect when an installation wizard is executed to install a new user application 132 such as a bundled application. During the installation process, the installation wizard may display a graphical user interface on the client 120 including a checkbox (or any other suitable type of user input) that prompts the user to decide whether to install the bundled application (or perform another action such as changing a default home page of a web browser or a default search engine). In response to detecting the attempted installation of the bundled application (e.g., detecting that the checkbox is pre-checked by the installation wizard), the real-time protection component 142 extracts evidence (e.g., metadata or various types of attributes) from the graphical user interface, user inputs such as the checkbox, or a process of the bundled application. The real-time protection component 142 applies a set of predefined rules to check the evidence. If the real-time protection component 142 determines that the evidence matches one of the predefined rules, the real-time protection component 142 can automatically configure the installation wizard to default to not installing the bundled application (e.g., unchecking or disabling the checkbox), or to provide a message to the user indicating that the bundled application has a high reputation for being an unwanted application. The message may be provided inline in the graphical user interface or as a pop-up window. If the evidence does not match any of the predefined rules, the real-time protection component 142 may leave the checkbox checked.

Figure 2:
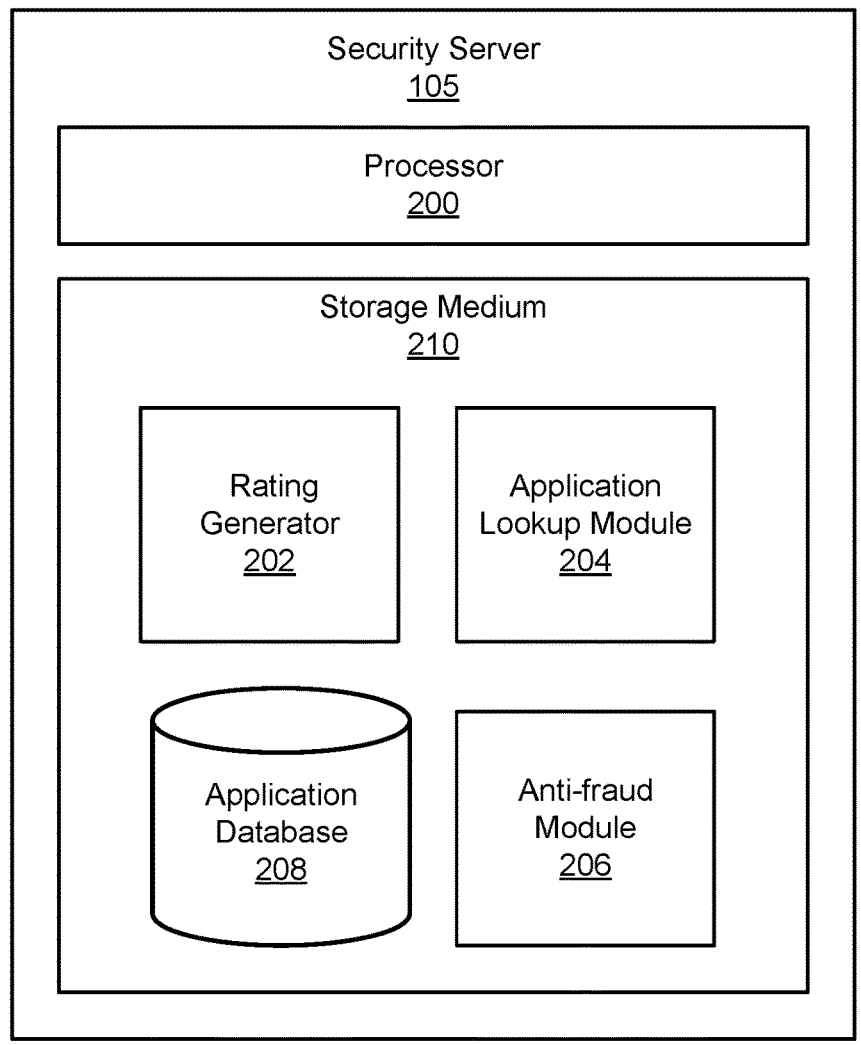
FIG. 2 is a block diagram illustrating an example embodiment of a security server.

FIG. 2 is a block diagram illustrating an example embodiment of a security server 105. The security server 105 includes a processor 200 for manipulating and processing data, and a storage medium 210 for storing data and program instructions associated with various modules. The storage medium 210 includes a rating generator 202, an application lookup module 204, an anti-fraud module 206, and an application database 208. Alternative embodiments may include different or additional modules or omit one or more of the illustrated modules.

The rating generator 202 generates application ratings (which may also be referred to as "ratings" herein) for applications. The rating for an application indicates its reputation for being an unwanted application. The rating generator 202 may generate the application ratings based in part on application retention data provided by the clients 120. For example, in one embodiment, the rating generator 202 tracks the number of times that clients 120 have reported detection of the application (e.g., by the application removal module 138) and the number of times the user chooses to remove the application in response to the detection. The rating generator 202 may then calculate the application rating based on the proportion of performed removal actions out of the total number of detections (including both declined removal actions and performed removal actions). Thus, a greater application rating indicates that the corresponding application has a stronger reputation for being an unwanted application because more users chose to remove the corresponding application.

In an embodiment, the rating generator 202 may weight removal actions performed by different clients 120 differently. For example, the contribution of application retention data from a particular client 120 to the application rating may depend on a user license level associated with the installed protection application 136. The rating generator 202 can determine the user license level (e.g., version) by obtaining the identifier indicating the version from the installed protection application 136 on the particular client 120. Thus, for example, application retention data received from a client 120 having the consumer-level version of the protection application 136 may be weighted less than application retention data received from a client 120 having the business-level or professional-level version of the protection application 136. In an embodiment, the rating may furthermore be based in part on manually entered reputation scores for known applications (e.g., provided by experts). For example, in one embodiment, the rating generator 202 may obtain consumer-level scores from application retention data received from consumer-level versions of the protection application 136, professional-level scores from application retention data received from professional-level versions of the protection application 136, and expert scores from manual input from experts. The scores may be weighted and combined to generate an overall score for each application, which may be used by the rating generator 202 to generate application ratings.

The application lookup module 204 receives information from the client 120 indicating the files detected on the client 120 that are associated with potentially unwanted applications. For each of the detected files, the application lookup module 204 performs a lookup in the application database 208 to obtain a definition associated with the corresponding potentially unwanted application. In some embodiments, the application lookup module 204 receives metadata describing a suspected unwanted application from the client 120. The application lookup module 204 performs the lookup using the metadata to obtain the definition for the suspected unwanted application. The application lookup module 204 provides the definition to the client 120. The client 120 is adapted to use the definition to selectively remove the potentially unwanted application and any associated components from the client 120. The definition specifies components of the application to allow the client 120 to completely remove the application. For example, the definition may indicate signatures of the components indicating directory addresses or paths describing where the components are stored on the clients 120. The components may include, for example, web browser toolbars, web browser add-ons/extensions, search providers, registry entries, scheduled tasks, services, desktop shortcuts, icons, hidden applications, or other types of files associated with unwanted applications. The application lookup module 204 may exclude certain types of components from the definitions such as operating system fixes and updates, graphics drivers, audio drivers, operating system drivers, or other types of files known to be useful or safe for the client 120.

The anti-fraud module 206 detects attempts to artificially lower the rating (i.e., improve the reputation) for a given application and prevents such actions from affecting the rating. The anti-fraud module 206 may detect application retention data as being fraudulent if it receives a significant number (over a detection threshold) of reports from the same client 120 each indicating that the client 120 selected to retain the application following detection. As an example use case, a client 120 installs an application and runs multiple scans using the protection application 136. During each scan, the client 120 selects to decline removal actions and retain the application in an effort to drive down the application rating of the application.

The anti-fraud module 206 can detect when a large number of submissions of application retention data originate from the same client 120 based on tracking identifying information of the client 120 such as an Internet Protocol (IP) address associated with the client 120, unique identifier of an application executing on the client 120, hardware serial number of the client 120, or any combination thereof.

The anti-fraud module 206 may also trigger an alert to an administrator of the security server 105 if the application rating for an application is above a predefined threshold rating and falls below the predefined threshold rating. This behavior is suspicious because once the application rating surpasses the predefined threshold rating, it is typically unlikely that the application rating will later fall below the predefined threshold rating absent the security server 105 receiving fraudulent application retention data. Thus, an administrator of the security server 105 may investigate the suspected fraudulent application retention data when the alert is triggered. If the administrator confirms fraudulent activity, the anti-fraud module 206 discards the suspected fraudulent application retention data, and may discard any subsequent application retention data from the fraudulent client 120. In some embodiments, the anti-fraud module 206 generates the predefined threshold rating based on aggregating application ratings generated by the anti-fraud module 206 for various applications (e.g., a linear combination of the application ratings).

The application database 208 stores information used by components of the security server 105. For example, the application database 208 may store application retention data and application ratings generated by the rating generator 202. The application database 208 can also store definitions for components of applications. In response to receiving information (e.g., application retention data or detections of potentially unwanted applications) from a client 120, the application database 208 stores the information along with the identifying information of the client 120. Thus, the security server 105 may identify clients 120 that previously provided information to the security server 105 by tracking the identifying information. The application database 208 can also store a predefined list of known unwanted applications, mappings between files and definitions for the applications associated with the files, or the predefined threshold rating used by the rating generator 202.

Figure 3:
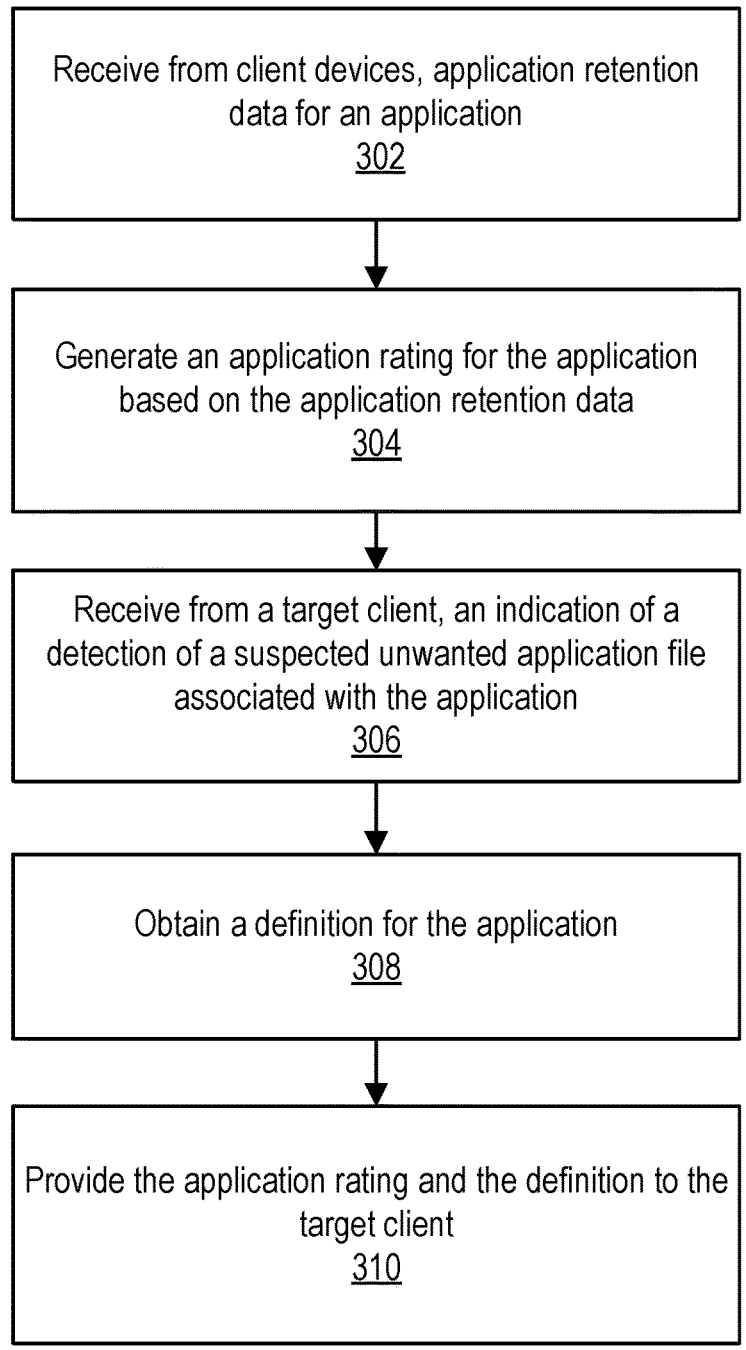
FIG. 3 is a flowchart illustrating an embodiment of a process for providing information for removing an unwanted application based on application retention data.

FIG. 3 is a flowchart illustrating an embodiment of a process for providing information for removing an unwanted application based on application retention data. The security server 105 receives 302 application retention data from clients 120 indicating whether users chose to retain or remove respective instances of an application when the instances of the application are detected in scans. The rating generator 202 (of the security server 105) generates 304 an application rating for the application based on the application retention data. In one embodiment, the application rating is generated based on a count of the detections of the application and another count of the selections to remove the respective instances of the application. An example of a process for generating the rating is described in further detail below with respect to FIG. 5.

The security server 105 receives 306, from a target client 120, an indication of a detection of a suspected unwanted application file associated with the application. Responsive to the indication of the detection, the application lookup module 204 obtains 308 a definition for the application associated with the detected file. The security server 105 provides 310 the application rating and the definition to the target client 120. Thus, the target client 120 can optionally remove the application file and the additional components. In some embodiments, the security server 105 may provide the application rating along with an indication that the application rating exceeds a predefined threshold rating (e.g., indicating that the application has a strong reputation for being unwanted).

Figure 4:
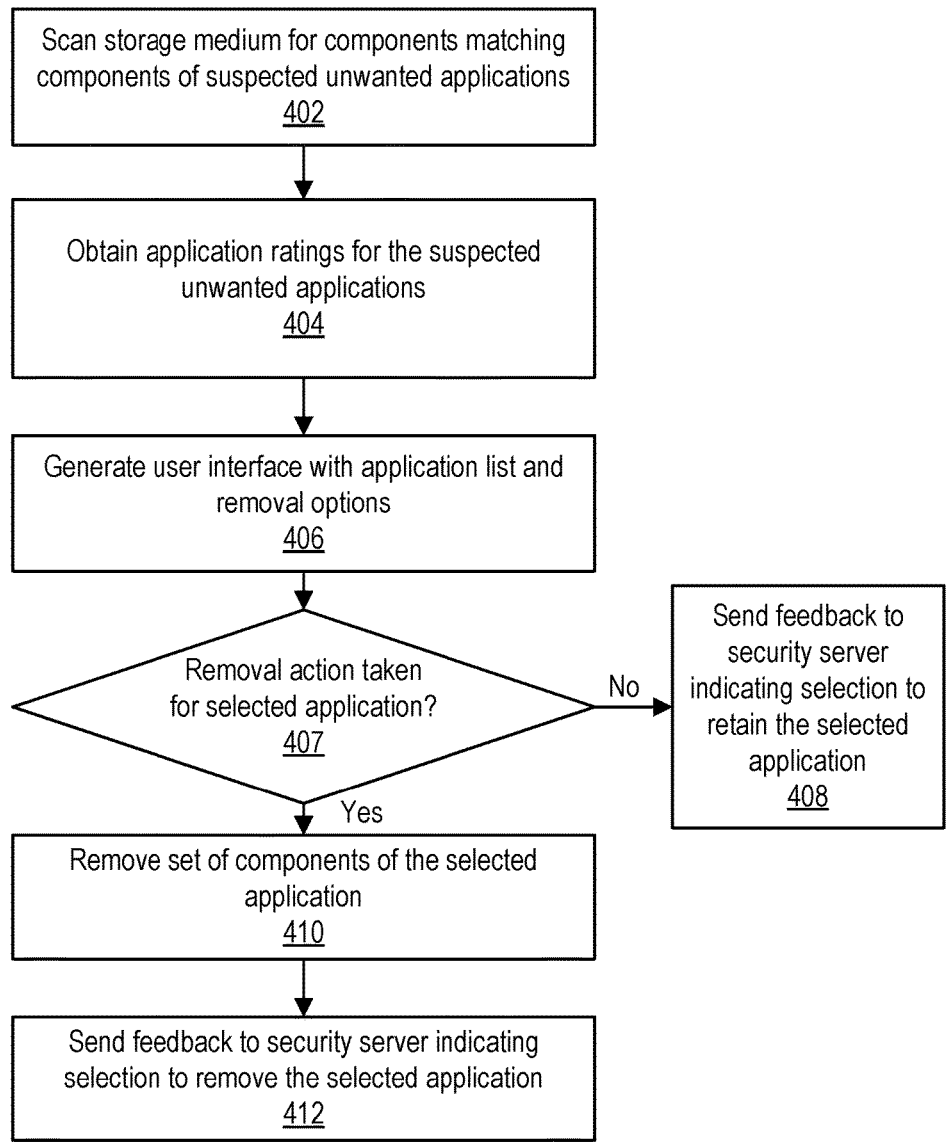
FIG. 4 is a flowchart illustrating an embodiment of a process for removing an unwanted application based on information from a security server.

FIG. 4 is a flowchart illustrating an embodiment of a process for removing an unwanted application based on information from a security server 105. An application removal module 138 of a client 120 scans 402 the storage medium 130 of the client 120 for components matching a predefined list of components of suspected unwanted applications. The application removal module 138 obtains 404, from the security server 105 or from a predefined list stored locally on the client 120, application ratings for applications associated with the detected components. The application removal module 138 generates 406 a user interface with an application list and removal options for uninstalling or retaining one or more suspected unwanted applications. In an embodiment, the application removal module 138 may compare the application ratings against a predefined threshold rating. In an embodiment, applications having application ratings that exceed the predefined threshold rating may be marked in the application list (e.g., highlighted or otherwise tagged) to indicate that have a strong reputation for being unwanted. Furthermore, a control element for selecting whether to retain or remove the application may be pre-selected by default for applications having ratings above the predefined threshold rating and unselected by default for applications having ratings below the predefined threshold rating. In another embodiment, applications having ratings below a certain threshold rating may be omitted entirely from the application list.

In response to receiving 407 an indication that the user declined to remove the selected application from the application list, the application removal module 138 sends 408 feedback to the security server 105 indicating the selection to retain the selected application. In response to receiving 407 an indication to that the user selected to remove a selected application (i.e., an unwanted application), the application removal module 138 removes 410 a set of components of the selected application based on a definition received from the security server 105. The application removal module 138 sends 412 feedback to the security server 105 indicating the selection to remove the selected application.

Figure 5:
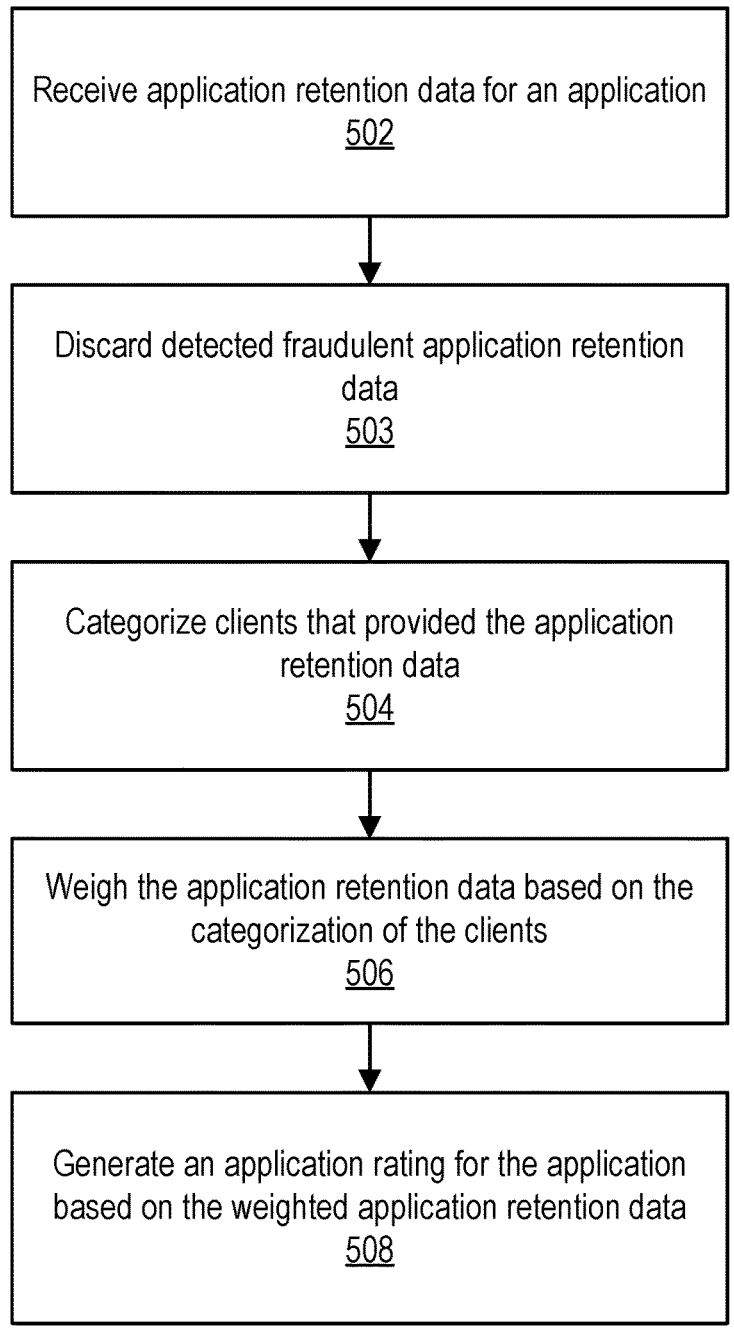
FIG. 5 is a flowchart illustrating an embodiment of a process for weighting application retention data based on client categorizations.

FIG. 5 is a flowchart illustrating an embodiment of a process for generating a rating for an application by weighting application retention data based on a type of installed protection application 136 (e.g., user license level). The security server 105 receives 502 application retention data from clients 120 for an application.

The anti-fraud module 206 discards 503 detected fraudulent application retention data. In one embodiment, the anti-fraud module 206 tracks reports of application retention data received from clients 120 for various applications. In response to determining that a particular client 120 reported more than a threshold number of reports for a given application, the anti-fraud module 206 designates the particular client 120 as fraudulent and disregards the reports from the particular client 120. For example, the anti-fraud module 206 discards detections of the given application received from the particular client 120 from a total count of the detections of the given application from the clients 120.

The rating generator 202 categorizes 504 the clients 120 that provided the application retention data into two or more categories. The client categories may represent different expected levels of reliability associated with the retention data received from those clients 120. Moreover, the expected levels of reliability may be based on the expected levels of expertise of the users of the particular clients. Example categories of client 120 may include, in increasing order of level of reputation, clients with consumer users, clients with business users, and clients used by information technology (IT) professionals. The rating generator 202 can determine the category based on a version of the protection application 136 executing on the client 120 (e.g., based on the product license information), which may correspond to, for example, a consumer-level version, a business-level version, or a professional-level version. The rating generator 202 can obtain an identifier from the client 120 that indicates the version of the corresponding protection application 136.

The rating generator 202 weighs 506 the application retention data based on the categorization of the clients from which the application retention data was received to generate sub-scores for each category. For instance, the rating generator 202 applies a greater weighting factor for removal actions or retention actions of IT professionals, relative to a weighting factor for actions of consumer users because data from professional users may be a more accurate indicator of the application's reputation. The rating generator 202 generates 508 an application rating for the application based on the weighted application retention data (e.g., as a linear combination of weighted sub-scores).

The above-described system and processes beneficially enables reliable detection and remediation of unwanted applications. By relying on application ratings generated based on application retention data together with the above-described security server 105, the protection application 136 can detect and remove many different instances of unwanted applications including additional components of the unwanted applications.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for generating information for removing an unwanted application, the method comprising:
    receiving, from a plurality of client devices, application retention data indicating detections of an application on the plurality of client devices and selections to remove respective instances of the application;
    receiving, from the plurality of client devices, identifiers indicating versions of protection applications executing on the plurality of client devices, the versions indicative of different reliability levels of the application retention data received from the plurality of client devices;
    weighting the application retention data based on the versions of the protection applications executing on the plurality of client devices to generate weighted application retention data;
    generating an application rating for the application based on the weighted application retention data;
    receiving from a target client device, an indication of a detection of a suspected unwanted application file associated with the application on the target client device;
    responsive to the indication of the detection, determining a definition for the application associated with the suspected unwanted application file; and
    providing to the target client device, the application rating and the definition for the application, wherein the target client device is adapted to use the definition for the application to selectively remove the application from the target client device.

2. The method of claim 1, wherein generating the application rating comprises determining a proportion of the selections to remove the application out of a total count of the detections of the application.

3. The method of claim 2, generating the application rating comprises:
    maintaining a count of selections to retain the application received from a particular client device;
    comparing the count to a threshold;
    designating the particular client device as fraudulent in response to determining that the count exceeds the threshold; and
    discarding the detections received from the particular client device designated as fraudulent from the total count of the detections of the application.

4. The method of claim 3, further comprising:
    determining that the selections to retain the application were received from the particular client device by tracking an internet protocol address associated with the particular client device.

5. The method of claim 1, wherein determining the definition for the application comprises:
    receiving from the target client device, metadata describing the suspected unwanted application file; and
    performing a lookup in an application database using the metadata to identify the definition for the application.

6. The method of claim 1, wherein providing to the target client device, the application rating and the definition for the application comprises:
    determining that the application rating exceeds a threshold rating, wherein the threshold rating is generated based at least in part on a plurality of application ratings for a plurality of applications;
    declaring the application as unwanted responsive to the application rating exceeding the threshold rating; and
    providing, to the target client device, an indication that the application is declared as unwanted.

7. The method of claim 1, wherein the versions include at least a first version associated with a consumer-level license to the protection applications and a second version associated with a professional-level license to the protection applications.

8. A non-transitory computer-readable storage medium storing instructions for generating information for removing an unwanted application, the instructions when executed by a processor causing the processor to perform steps including:
    receiving, from a plurality of client devices, application retention data indicating detections of an application on the plurality of client devices and selections to remove respective instances of the application;
    receiving, from the plurality of client devices, identifiers indicating versions of protection applications executing on the plurality of client devices, the versions indicative of different reliability levels of the application retention data received from the plurality of client devices;
    weighting the application retention data based on the versions of the protection applications executing on the plurality of client devices to generate weighted application retention data;
    generating an application rating for the application based on the weighted application retention data;
    receiving from a target client device, an indication of a detection of a suspected unwanted application file associated with the application on the target client device;
    responsive to the indication of the detection, determining a definition for the application associated with the suspected unwanted application file; and
    providing to the target client device, the application rating and the definition for the application, wherein the target client device is adapted to use the definition for the application to selectively remove the application from the target client device.

9. The non-transitory computer-readable storage medium of claim 8, wherein generating the application rating comprises determining a proportion of the selections to remove the application out of a total count of the detections of the application.

10. The non-transitory computer-readable storage medium of claim 9, wherein generating the application rating comprises:
    maintaining a count of selections to retain the application received from a particular client device;
    comparing the count to a threshold;
    designating the particular client device as fraudulent in response to determining that the count exceeds the threshold; and discarding the detections received from the particular client device designated as fraudulent from the total count of the detections of the application.

11. The non-transitory computer-readable storage medium of claim 10, wherein the instructions when executed by the processor cause the processor to perform further steps including:
determining that the selections to retain the application were received from the particular client device by tracking an internet protocol address associated with the particular client device.

12. The non-transitory computer-readable storage medium of claim 8, wherein determining the definition for the application comprises:
receiving from the target client device, metadata describing the suspected unwanted application file; and
performing a lookup in an application database using the metadata to identify the definition for the application.

13. The non-transitory computer-readable storage medium of claim 8, wherein providing to the target client device, the application rating and the definition for the application comprises:
determining that the application rating exceeds a threshold rating, wherein the threshold rating is generated based at least in part on a plurality of application ratings for a plurality of applications;
declaring the application as unwanted responsive to the application rating exceeding the threshold rating; and
providing, to the target client device, an indication that the application is declared as unwanted.

14. The non-transitory computer-readable storage medium of claim 8, wherein the versions include at least a first version associated with a consumer-level license to the protection applications and a second version associated with a professional-level license to the protection applications.

15. A computing system comprising:
a processor; and
a non-transitory computer-readable storage medium storing instructions for generating information for removing an unwanted application, the instructions when executed by the processor causing the processor to perform steps including:
receiving from a plurality of client devices, application retention data indicating detections of an application on the plurality of client devices and selections to remove respective instances of the application;
receiving, from the plurality of client devices, identifiers indicating versions of protection applications executing on the plurality of client devices, the versions indicative of different reliability levels of the application retention data received from the plurality of client devices;
weighting the application retention data based on the versions of the protection applications executing on the plurality of client devices to generate weighted application retention data;
generating an application rating for the application based on the weighted application retention data;
receiving from a target client device, an indication of a detection of a suspected unwanted application file associated with the application on the target client device;
responsive to the indication of the detection, determining a definition for the application associated with the suspected unwanted application file; and
providing to the target client device, the application rating and the definition for the application, wherein the target client device is adapted to use the definition for the application to selectively remove the application from the target client device.

16. The computing system of claim 15, wherein generating the application rating comprises determining a proportion of the selections to remove the application out of a total count of the detections of the application.

17. The computing system of claim 16, wherein generating the application rating comprises:
maintaining a count of selections to retain the application received from a particular client device;
comparing the count to a threshold;
designating the particular client device as fraudulent in response to determining that the count exceeds the threshold; and
discarding the detections received from the particular client device designated as fraudulent from the total count of the detections of the application.

18. The computing system of claim 17, wherein the instructions when executed by the processor cause the processor to perform further steps including:
determining that the selections to retain the application were received from the particular client device by tracking an internet protocol address associated with the particular client device.

19. The computing system of claim 15, wherein providing to the target client device, the application rating and the definition for the application comprises:
determining that the application rating exceeds a threshold rating, wherein the threshold rating is generated based at least in part on a plurality of application ratings for a plurality of applications;
declaring the application as unwanted responsive to the application rating exceeding the threshold rating; and
providing, to the target client device, an indication that the application is declared as unwanted.

20. The computing system of claim 15, wherein the versions include at least a first version associated with a consumer-level license to the protection applications and a second version associated with a professional-level license to the protection applications.

* * * * *